Dec. 30, 1969 R. E. BONNET 3,486,301
HYDROGEN DIFFUSION APPARATUS

Filed Aug. 5, 1968 2 Sheets-Sheet 1

INVENTOR.
ROBERT E. BONNET
BY Samuel Kahn
ATTORNEY

Dec. 30, 1969    R. E. BONNET    3,486,301
HYDROGEN DIFFUSION APPARATUS
Filed Aug. 5, 1968    2 Sheets-Sheet 2

INVENTOR.
ROBERT E. BONNET
BY
*Samuel Kahn*
ATTORNEY

United States Patent Office 3,486,301
Patented Dec. 30, 1969

3,486,301
HYDROGEN DIFFUSION APPARATUS
Robert E. Bonnet, Murray Hill, N.J., assignor to Engelhard Minerals & Chemicals Corporation, Newark, N.J., a corporation of Delaware
Filed Aug. 5, 1968, Ser. No. 750,117
Int. Cl. B01d 13/00
U.S. Cl. 55—158        4 Claims

ABSTRACT OF THE DISCLOSURE

Hydrogen diffusion apparatus is disclosed which employs thin hydrogen permeable foils cushioned by a porous flexible refractory which separates the foils from solid metal plate supports which are bored for flow of diffused hydrogen gas to manifold collection means.

---

This invention relates to apparatus for the separation of pure hydrogen from gaseous mixtures containing hydrogen, said apparatus being of the kind including at least one diffusion cell, the effective walls of which are made of a material permeable to hydrogen such as palladium or palladium alloys.

Apparatus for separating hydrogen from gaseous mixtures and purifying hydrogen by permeation through thin non-porous barriers of palladium or palladium alloys is known. Such apparatus has taken various forms, e.g. it is known to use thin tubes of hydrogen-permeable metal as the barrier means, the hydrogen-containing gases being contacted with one side of such tubes and pure diffused hydrogen being removed from the outer side. Generally, hydrogen diffusion apparatus is employed at elevated temperatures and pressures and at conditions which establish a hydrogen pressure differential across the hydrogen-permeable diffusion barrier.

As an alternative to the use of thin metal tubes for diffusion separation and/or purification of hydrogen, apparatus has been devised which employs thin sheets or foils of hydrogen-permeable metal. Procedures and apparatus have been disclosed in the art for positioning or disposing such thin-metal films or foils in suitable diffusion apparatus, including means for reinforcing or supporting such thin films or foils so as to make practicable operating pressure differentials across such foil barriers of the order of several hundred pounds per square inch. For example, U.S. Patent No. 1,174,631 of Snelling discloses the use of thin palladium sheets supported upon porous backing materials such as porous earthenware or Alundum. Porous backings which are sandwiched between suitable Group VIII metal diffusion barrier are disclosed in U.S. Patent No. 2,958,391 of A. J. de Rosset. More recently, diffusion apparatus using fine mesh screen supports has been taught by H. K. Straschil in U.S. Patent No. 3,238,704.

The object of the present invention is to provide apparatus of the foil-type in a simple and efficient form.

In apparatus in accordance with the present invention, each diffusion cell comprises a pair of hydrogen-permeable foil elements welded at their peripheral edges to opposite sides of a channelled pure hydrogen collection plate, and supported by a woven inert cloth of carbon. Adjacent diffusion cells of the apparatus are separated from each other by peripheral shoulders on each of the pure hydrogen collection plates to provide impure inlet gas chambers adjacent each diffusion foil element. Means are provided for introducing impure gas to the assembly and for bleeding off undiffused gases so as to provide a continuous flow of feed gas across the foil surfaces. Pure hydrogen from each diffusion cell is collected for delivery from a manifold line in fluid flow relationship with each diffusion cell of the assembly.

In order to more fully understand the invention, certain embodiments thereof are now described, by way of example, by reference to the accompanying diagrammatic drawings in which the same numerals are used to identify parts and in which FIGURE 1 is a sectional view of apparatus constructed according to the preferred embodiment of the invention;

Figure 1:
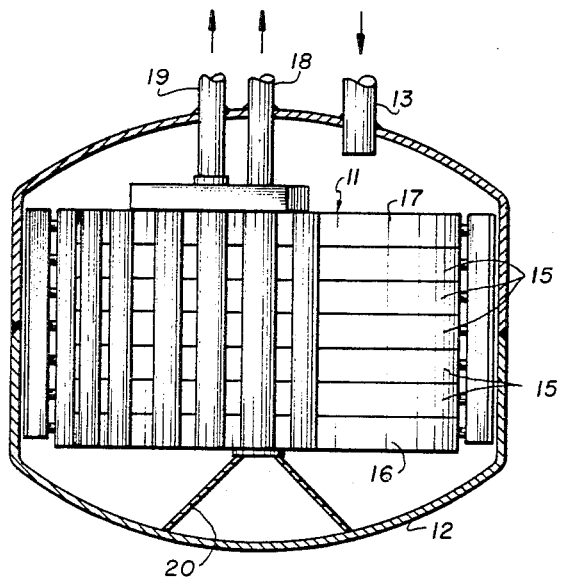

Referring to FIGURE 1, diffusion cell assembly 11 is disposed within outer pressure resistant shell 12 having impure gas inlet 13. Shell 12 may be fabricated of any metal normally resistant to hydrogen, e.g. stainless steel, and capable of withstanding elevated pressure, for example up to about 1000 p.s.i.g. Diffusion cell assembly 11, as more fully described hereinafter, consists of one or more disc-shaped diffusion cells 15 (five are shown in FIGURE 1), and having a bottom cover plate 16 and manifold plate 17, and provided with pure gas outlet 18 and bleed gas outlet 19. Assembly 11 may be supported in chamber 12 by welded attachment to lines 18 and 19 or, alternatively, by brackets or other supports, for example as shown at 20.

Figure 2:
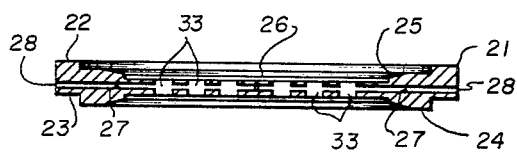
FIGURE 2 is a cross-section of the pure gas plate shown in FIGURE 3.
Figure 3:
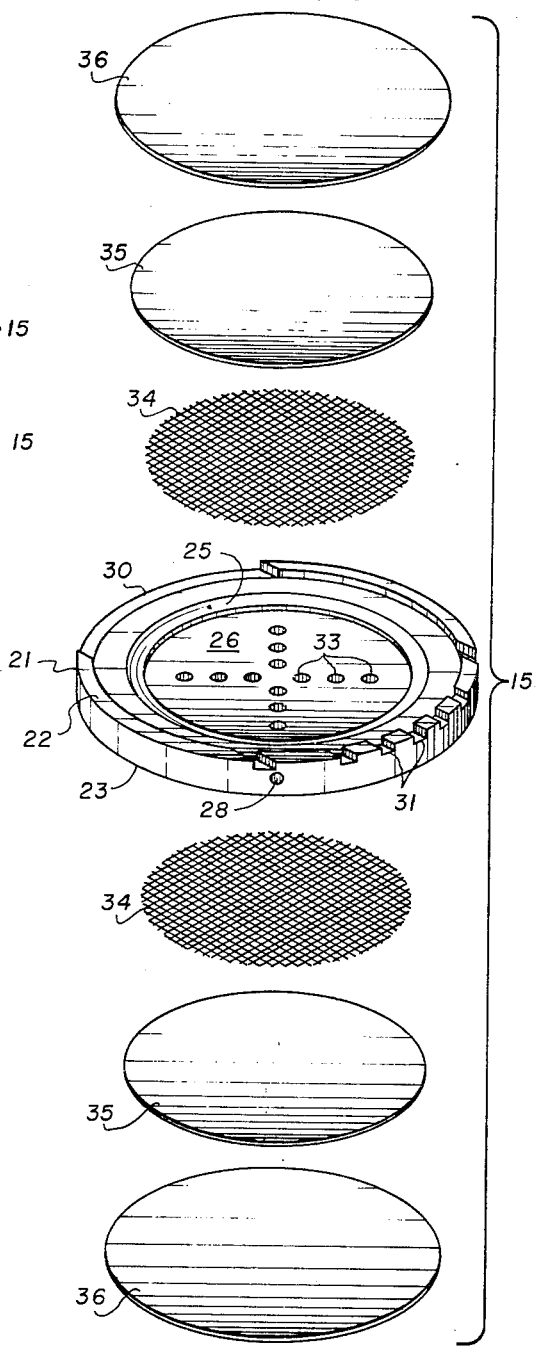
FIGURE 3 is an exploded perspective view of a foil diffusion cell constructed in accordance with the invention.

Referring now to FIGURES 2 and 3, a cross section of one embodiment of the foil supporting plate 21 and an exploded view of the diffusion cell 15 are depicted. Pure gas plate 21 comprises a solid disc-shaped element having integral lip 22 and recessed shoulder 23 on opposite peripheral edges of the plate, and dimensioned so that, on assembly, adjacent plates fit snugly together. Contiguous to lip 22 and recess 23 of each plate is a substantially flat narrow circular segment 24 and sloping segment 25 which provides a recess 26 into which supporting materials (as hereinafter described) for the diffusion foil will fit. Each plate is bored with one or more passages 27 which extend through the plate and are in gas communication with the peripheral edge of the plate through bore holes 28. Two such bores are shown in FIGURE 2 which, however, is provided with 4 bores as shown in FIGURE 3 to provide pure gas outlets at each quadrant of the plate.

As more fully shown in FIGURE 3, a segment of lip 22 of plate 21 subtending an angle of from about 30° to about 90° is cut away as at 30 to provide a slot between adjacent assembled plates through which impure feed gases pass from chamber 12 into the diffusion cell. At one or more points 31 on the opposite side of the plate, lip 22 is notched to provide for egress of undiffused gas from the impure side of the diffusion cell.

Plate 21 is bored on its recessed surface with openings 33 which communicate with bores 27 and permit diffused pure gas to pass from the inside of the diffusion cell to openings 28 from which the pure gas may be withdrawn as product. As shown in FIGURE 3, on each side and within recesses 26 of the pure gas plate are nested a metallic screen 34 followed by one or more sheets of carbon cloth 35 upon which is superimposed hydrogen diffusion foil 36. The purpose of screen 34 is to provide a gas pervious area adjacent the pure plate surface, and it will be understood that alternate equivalent supporting structures, for example a grooved or perforated metal plate may be employed in place of the rigid metal wire screen shown in the figure. In fabricating the embodiment depicted in the drawings, 303 stainless steel screen of mesh size 60–60 of 0.011″ diameter wire was employed, but mesh sizes may vary from 8–8 to 200–200, and other materials inert to hydrogen may be used.

In certain embodiments of the invention, screen 34 may be dispensed with altogether, and the hydrogen diffusion foil separated from pure plate 21, and fully supported, by one or more layers of a soft, cushioning material such as carbon cloth 35. Because of the rigid structure of pure plate 21, it is only necessary to provide a porous cushioning material as backing for the foil in order to provide a gas permeable area adjacent the pure plate surface so that diffused gas has an unimpeded flow-path to bores 33 in plate 21. While carbon cloth has been employed in the described embodiment, other porous, flexible cushioning refractory materials such as glass cloth or woven refractory oxide cloths made, for example, by impregnating a cotton fabric with a refractory oxide and then burning off the organic material, may likewise be employed. The supporting material may be woven or felted, provided only that it has sufficient rigidity to resist compression and compaction with attendant loss of porosity under the applied feed gas pressure. Carbon cloth has been found particularly effective as a support in direct contact with the diffusion foil by reason of its inertness and flexibility. Suitable carbon cloth is available commercially from National Carbon Co., and may be obtained in weave size of 28–24 to 51–51. Where a metal screen such as screen 34 is employed, the soft, cushioning material serves the added function of protecting the fragile diffusion foil from contact with any sharp edges of the metal screen which might cause pin-hole formation.

The diffusion foil 36 is fabricated of palladium or palladium alloys which are permeable to hydrogen, e.g. palladium-silver, palladium-gold alloys and the like. Foils of 0.1 to about 3.0 mils in thickness, preferably 1.0–1.5 mils are used, and it is preferable to use the thinnest possible foil in order to maximize the rate of diffusion therethrough. It may be possible to use foils even thinner than 0.5 mil.

In assembling diffusion cell 15, screen 34, carbon cloth 35 and foil 36 are preferably fitted to one side of plate 21, and the opposite side of the plate made gas tight. A vacuum is then drawn through bore 28 to provide a snug fit of foil 36 against shoulder 24. The foil is then tack-welded in position, and while the assembly is still under vacuum, the foil is continuously welded around its peripheral edge to shoulder 24, employing, for example, a spot welder of the type manufactured by Sippican Inc. (Model 160), or by inert gas arc welding. In the spot welding operation each weld overlays the adjacent one so that a leak-proof seal is effectively formed between foil 36 and plate 21.

Figure 4:
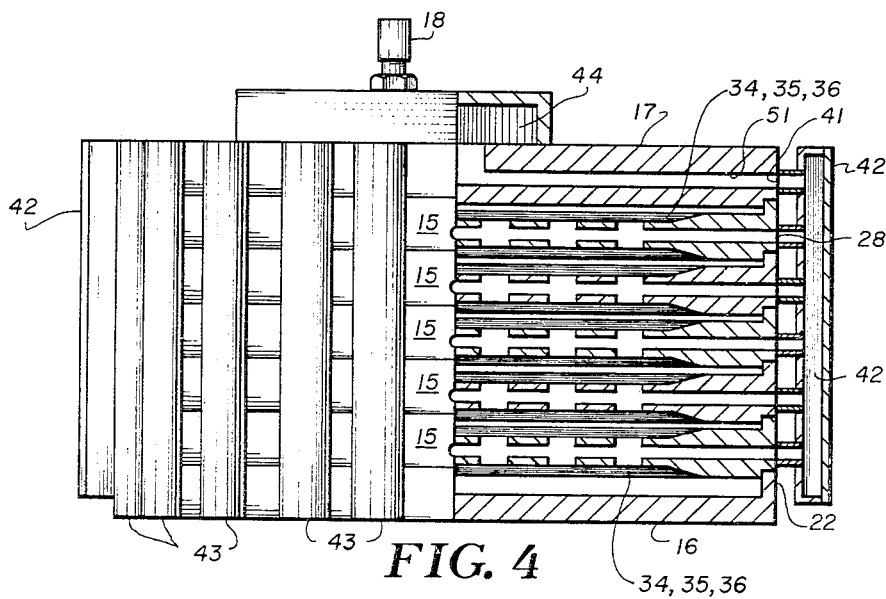
FIGURE 4 is a side elevation of the diffusion assembly partially cut away to show the foil diffusion cells dispersed therein.
Figure 5:
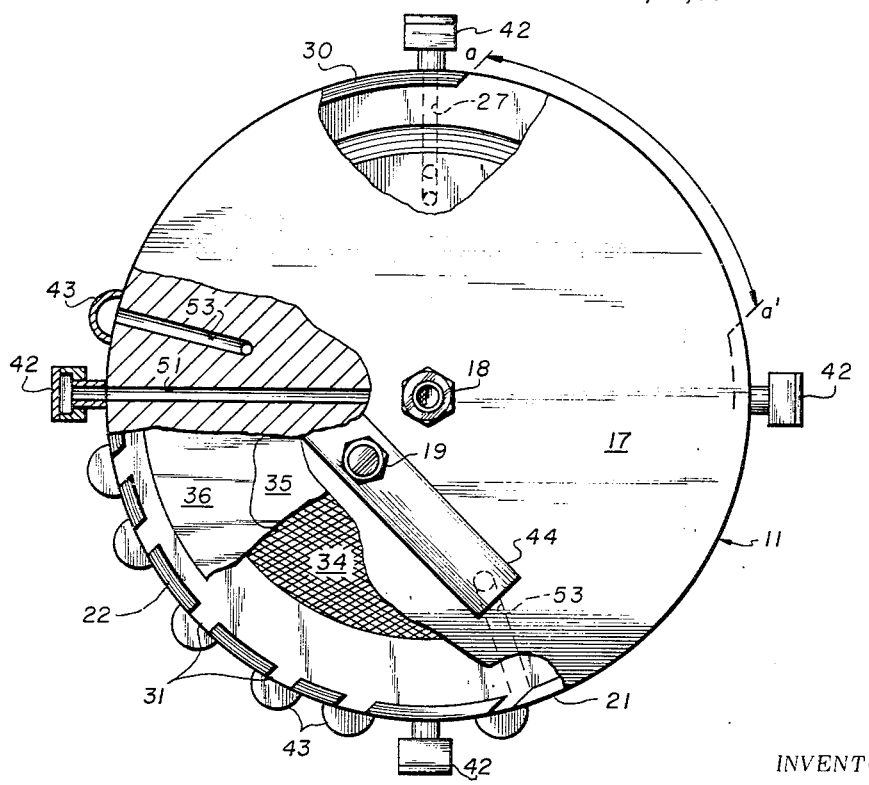
FIGURE 5 is a plan view partially cut away of a diffusion apparatus constructed in accordance with the preferred embodiment of the invention.

Referring now to FIGURES 4 and 5, assembled diffusion cells 15 of which five are shown in FIGURE 4 are snug-fitted together and capped at one end by cover plate 16 which is provided with lip 22 to fit recess 23 of the adjacent pure plate. At the opposite side of the assembly, manifold plate 17 is provided which consists of a disc-shaped plate having bore hole 41 opening at the peripheral edge of the plate and leading to bore 51 which connects with pure gas outlet 18. Each of bores 28 in pure plates 21 open into manifold 42, through which pure $H_2$ passes from the diffusion cells to the manifold plate 17. As shown in FIGURE 4, and perhaps more clearly apparent from FIGURE 5, the bleed ports 31 from each of the diffusion cells are manifolded by ducts 43 in gas-tight relation with chamber 44 into which bleed gas passes by bores 53 and from which bleed gas is withdrawn through line 19. FIGURE 5 shows a partially cut-away planar view of the diffusion assembly. As shown therein the diffusion plate 21 within which is carried screen 34 graphite cloth 35 and foil 36 is provided with an inlet duct by cutting away a sector of shoulder 22 from $a$ to $a'$. Pure diffused gas collected in the pure gas chamber passes by bores 27 to bore 51 in manifold plate 17 and thence to pure gas outlet 18. Each of the bleed gas ducts 31 is manifolded by ducts 43 which may, for example, be ½-inch semi-cylindrical pipe sections. Bleed gas from the diffuser cell passes by ducts 43 to bores 53 in manifold plate 17 to collection chamber 44 which is trough-shaped and covers counter-bores in the manifold plate communicating with bores 53.

In assembling the apparatus of the present invention, diffusion cell assembly 11, consisting of a series of diffusion cells together with cover plate and manifold plate is fitted together and tack-welded to form a unitary structure. It is not necessary on the feed-gas side to establish leak-proof seals between each of the diffusion cells of the assembly. In fabrication, however, the pure gas side of the cells is assembled so as to be leak-proof and capable of obtaining 99.9999+ purity hydrogen on the downstream side of the foils.

The operation of the preferred embodiment of the invention as shown in FIGURES 1 to 5, inclusive will now be described. Referring particularly to FIGURE 1, a gaseous mixture, for example, a mixture of hydrogen and methane, is introduced into vessel 12 under a pressure, for example of 500 p.s.i.g. and at a temperature of 350–600° C. through line 13. As can be seen most clearly in FIGURES 3 and 5, the gaseous mixture under superatmospheric pressure in vessel 12 enters the diffusion cells through passages 30 which are open to the vessel. The gaseous mixture flowing in through passages 30 passes over the diffusion foils 36, is depleted in hydrogen which passes by diffusion through foils 36 and into recess 26 of the diffusion cell. Undiffused bleed gas flows through the cell and exits through passages 31 into collecting manifolds 43 from which the bleed gas passes through bores 53 in manifold plate 17 into bleed gas collection chamber 44 for venting by line 19.

Pure hydrogen gas which has diffused through foils 36 passes by bores 33 and bores 27 into manifold 42 from which the pure gas passes by bores 51 in manifold plate 17 to pure gas outlet 18. It will be understood that each of line 18 and 19 would normally be valved and that control of the rate of flow of feed gas across the diffusion foils is then readily controllable by adjustment of the rate of flow of bleed gas through line 19.

It is to be understood that various modifications in the apparatus described herein may be made by those skilled in the art without departing from the scope of the invention as claimed herein. For example, passages 30 which are provided for admitting feed gas into the diffusion cell may be replaced by one or more pipe connections through which the feed gas may be introduced to the diffusion cell. Similarly, passages 31 may consist of drilled openings in the peripheral edge of the pure gas plate. Other modifications and variations will readily occur to those skilled in the art.

What is claimed is:

1. Apparatus for separation of hydrogen from a gaseous mixture containing hydrogen comprising a vessel having gas inlet means, and disposed within said vessel a series of adjacent chambers in side-by-side relationship, said chambers being defined by a plurality of thin non-porous hydrogen-permeable foils disposed in side-by-side parallel planes, each pair of said foils being peripherally welded in gas tight relationship to a perforated plate to define a pure gas chamber, said pure gas chamber having at least one conduit bored in the plate for removal of diffused hydrogen therefrom, each foil being spaced from said plate by a porous flexible refractory support, each of said plates having a peripheral lip on one side and a peripheral shoulder on the other side, said peripheral lip being adapted to abut said peripheral shoulder on the next adjacent plate to define alternate impure gas chambers for receiving the gas mixture to be separated, means for introducing feed gas from said vessel to said impure gas chambers and manifold means for withdrawing undiffused gas from said impure chambers and for collecting diffused hydrogen from each of said pure gas chambers, and conduits for withdrawing pure hydrogen and undiffused gas from said vessel.

2. Apparatus of claim 1 wherein the means for introducing feed gas from the vessel to each impure gas chamber comprises a slot formed by cutting away a segment of the peripheral lip of each plate.

3. Apparatus of claim 1 wherein a metal screen support is interposed between the plate and the porous flexible refractory support.

4. Apparatus of claim 1 wherein the porous flexible refractory support is carbon cloth.

References Cited

UNITED STATES PATENTS

| | | | |
|---|---|---|---|
| 3,238,703 | 3/1966 | Straschil et al. | 55—158 |
| 3,238,704 | 3/1966 | Straschil et al. | 55—158 |
| 3,336,730 | 8/1967 | McBride et al. | 55—16 |
| 3,344,586 | 10/1967 | Langley et al. | 55—158 |
| 3,410,058 | 11/1968 | Oswix | 55—158 |

REUBEN FRIEDMAN, Primary Examiner

C. N. HART, Assistant Examiner